United States Patent [19]

Krampe

[11] Patent Number: 4,587,731
[45] Date of Patent: May 13, 1986

[54] TOOL FOR CUTTING AND STRIPPING CABLE

[76] Inventor: Josef Krampe, An der Vogelrute 32, 4715 Ascheberg-Herbern, Fed. Rep. of Germany

[21] Appl. No.: 502,342

[22] Filed: Jun. 8, 1983

[30] Foreign Application Priority Data

Apr. 29, 1983 [AT] Austria .................................. 7556/83

[51] Int. Cl.$^4$ ............................................. H02G 1/12
[52] U.S. Cl. ..................................................... 30/90.1
[58] Field of Search .............. 81/9.5 R; 30/90.1, 91.2, 30/124, 91.1

[56] References Cited

U.S. PATENT DOCUMENTS

| | | | |
|---|---|---|---|
| 2,141,002 | 12/1938 | Huff | 30/91.2 |
| 2,376,858 | 5/1945 | Barran et al. | 81/9.5 R |
| 2,659,140 | 11/1953 | Davison | 30/91.1 |
| 2,683,308 | 7/1954 | Cook, Jr. | 30/91.1 |

FOREIGN PATENT DOCUMENTS

| | | | |
|---|---|---|---|
| 685153 | 12/1939 | Fed. Rep. of Germany | 30/91.2 |
| 2932501 | 2/1981 | Fed. Rep. of Germany . | |

*Primary Examiner*—Roscoe V. Parker
*Attorney, Agent, or Firm*—Michael J. Striker

[57] ABSTRACT

A cutting tool for stripping cables and wires comprises two pivotable gripping cheeks provided with cutting edges. The cheeks are pivoted about an axis of symmetry of the tool between an open position in which the cable is inserted into the tool and a closed position in which the cutting edges produce a circular cut in an insulation sheath of the cable.

22 Claims, 11 Drawing Figures

TOOL FOR CUTTING AND STRIPPING CABLE

BACKGROUND OF THE INVENTION

The present invention relates to cutting tools in general and more particularly to tools for stripping wires, cables or the like articles.

In stripping insulating material or sheathing from cables or wires a circular cut is first made in the sheath of insulation inwardly from the periphery of the cable and the severed portion of the cable is then slitted in the longitudinal direction to remove the sheath from the wire.

Cutting tools for stripping wires and cables are known in the art. One of such tools is disclosed for example, in the applicant's Pat. No. 3,483,617.

Conventional cable strippers are known which include two gripping cheeks the ends of which are movable towards each other by means of a slidable sleeve which surrounds the cheeks, the cheeks carrying on the inner opposite sides thereof cutting elements or cutting edges. The width and the thickness of the cutting edges used in the art usually correspond to the thickness of the insulation sheath, these cutting edges projecting normal to the elongation of the cheeks.

The cable being processed normally is guided between two gripping cheeks and the sleeve is displaced in the counter forward direction over the cheeks so that the ends of the gripping cheeks are moved one to another and the cutting edges penetrate the insulation sheath. Then the cutting tool is rotated about its longitudinal axis until the insulation sheath is separated from the core of the cable along the whole periphery of the cable. Upon rotation of the sleeve in the opposite direction the severed portion of the insulation sheath is stripped from the wire.

The disadvantage of this otherwise satisfactory conventional cutting tool is that because the cable must be inserted and guided between the gripping cheeks the attention of the operator has been directed to the procedure of the insertion of the cable which has been rather difficult. On the other hand, non-precise separation of the severed portion from the wire due to sticking of the severed portion over a determined length to the wire has not been avoided. Finally, the displacement of the sleeve to move the gripping cheeks to each other and away from each other caused a continuous force tensions. In short, the function of the known cutting tool has not been ideal.

Furthermore, conventional cutting tools of the foregoing type had no special stripping means which would make the stripping process rather easy.

SUMMARY OF THE INVENTION

It is an object of the present invention to provide an improved cutting tool for stripping wires or cables.

It is a further object of the invention to provide a cutting and stripping tool, in which insertion and fastening of the cable between the grippers of the tool is accomplished without a special sleeve of conventional tools.

It is still a further object of the invention to provide a cutting tool in which a favorable force distribution during the operation of the tool is obtained.

These and other objects of the invention are attained by a cutting tool for stripping an insulation sheath from single-wire or multi-wire cables, having an axis of symmetry and comprising two elongated and curve-shaped gripping cheeks connected to each other, each of said cheeks having an inner face and carrying at least one cutter element having a width substantially corresponding to a thickness of the sheath to be stripped from a cable, the respective cutter element being arranged on the inner face of the assigned gripping cheek and extended therefrom in the direction substantially perpendicular to the elongation of the respective cheek, said cheeks being pivotally mounted to each other to pivot about said axis of symmetry between an open position to receive a cable to be processed and a closed position in which the inner faces of the gripping cheeks are located opposite each other and said cutter elements are in the position to make a cut on said insulation sheath.

The gripping cheeks may be connected to each other by at least one hinge joint or by a number of hinge joints.

At least one of the gripping cheeks may be formed with a projection for a hand manipulating by the tool.

Furthermore, the cutting tool of the invention may be provided with wire-stripping means.

The wire-stripping means may comprise two knife blades each rigidly connected to the respective gripping cheek, said gripping cheeks each having an outer face opposite to the inner face carrying the cutter element, said knife blades being mounted to the outer faces of the respective cheeks, said knife blades having end blade portions which engage one over another in a scissor-like manner when said cheeks are in the closed position, to strip the insulation sheath from a wire of the cable. Due to the provision of the special wire-stripping means the separation of the severed portion of the insulation sheath can be performed effortless and easy.

According to still another feature of the invention the wire-stripping means may include a plurality of dents with sharp edges, said cheeks each including an elongated edge on the inner face thereof, said dents being disposed in mirrow-inverted pairs and formed, respectively, on said elongated edges of the gripping cheeks.

The advantage of this embodiment of the invention resides in that in addition to the removal of the severed portion of the insulation sheath the stripping of the individual wire of the cable is also possible. Thereby a workman can employ just a single tool for stripping the cable and its wires in the case of the multi-wire cable instead of two individual tools.

According to a further feature of the invention the cutter elements may be of a shape which conforms to the shape of the inner faces of the respective gripping cheeks.

Each cutter element may be formed of two pieces. These two pieces may be arranged at an angle to each other.

The shape of the cutter element may be constituted by a portion of a circle.

In any case the cutting edges of cutter elements are expanded or have a greater length as compared to straight one-piece conventional cutter elements. Furthermore, the surface of clamping of the cable inserted between two cheeks is enlarged when a two-piece element in place of one-piece cutter element is employed. The round or circular surface of the circular cutter element is also very effective.

Due to the provision of the longer cutter edges the cutting tool may be rotated only through 90° to accomplish a complete cut of the insulation sheath whereas with conventional cutting edges the rotation of the tool over 180° had been performed to produce a suitable circular cut.

According to still another feature of the invention at least two projections may be formed on each cheek for a hand manipulating by the tool said projections being spaced from each other in the direction of elongation of the respective cheek to form humps with a space therebetween, the respective projections formed on two opposite cheeks being symmetrical with respect to the axis of symmetry.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE PREFERRED EMBODIMENTS

DETAILED DESCRIPTION OF THE PREFERRED EMBODIMENTS

Figure 1:
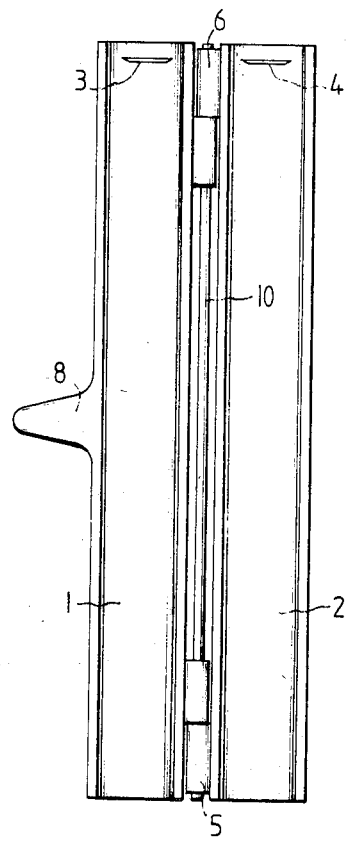
FIG. 1 is a side view of a cutting and stripping tool with two gripping cheeks in the open position, according to a first embodiment of the invention.

Referring now to the drawings and first to FIG. 1, the cutting tool for stripping insulating material from cables is comprised of two elongated gripping cheeks 1 and 2 of which each is provided with a cutting projection or cutting edge 3 or 4, respectively. Each cheek has a semi-cylindrical or partially cylindrical shape. Gripping cheeks 1 and 2 are pivotally connected to each other by means of pivot joints 5 and 6 spaced from each other in the direction of elongation of the cheeks as shown in FIG. 1. When cheeks 1 and 2 are pivoted to a closed position shown in FIG. 4 they form a hollow body within the interior of which a cable 30, the insulation of which is to be stripped off, is received.

After cable 30 has been inserted into the preliminarily open gripping cheeks 1 and 2 cutting edges 3 and 4, upon pivoting of cheeks 1 and 2 towards each other and closing those cheeks penetrate the insulating material or so-called "sheating" and, upon rotation and slight lateral bending of the cheeks, a circular cut is provided in the jacket or sheath of the cable 30. Upon drawing of the cheeks in the axial direction from the cable or pulling the cable down from the cheeks a separated piece of the insulating sheath is stripped off from the cable.

Figure 4:
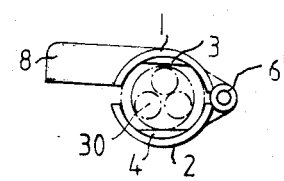
FIG. 4 is a top plan view of the tool of FIG. 1 or 3 but with two gripping cheeks in the closed position and with a cable inserted therebetween.

A lateral projection 8 provided at one of the cheeks, here on cheek 1, serves for hand manipulating of the cutting tool. Cable 30 shown in FIG. 4, is a multi-wire cable. It is, of course, understood that a single wire cable coated with an insulating sheath can be stripped off by the tool of the invention.

Figure 3:
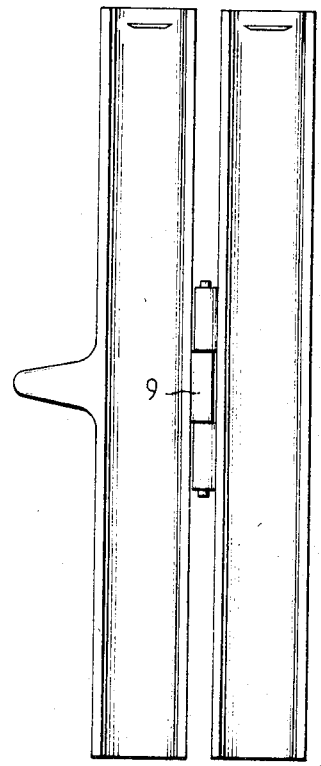
FIG. 3 is a side view of the stripping tool according to a second embodiment of the invention.
Figure 2:
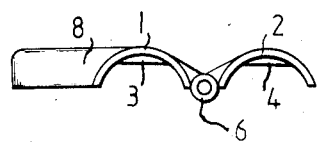
FIG. 2 is a top plan view of FIG. 1.

It is to be realized that a single hinge joint 9 can be used for a pivotal connection of two cheeks to each other as shown in FIG. 3. A hinge axle 10 seen in FIG. 1 is a common axle for two hinge joints 5 and 6.

For the sake of clarity the same reference numerals designate the similar elements in all Figures of the drawings.

Figure 5:
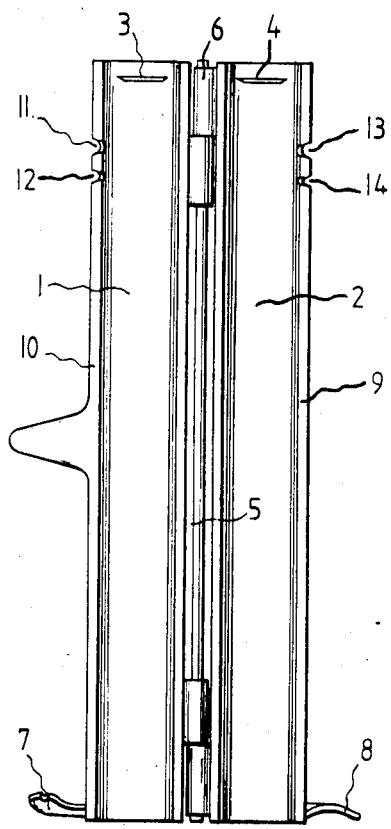
FIG. 5 is a side view of a stripping tool with two gripping cheeks in the open position, according to a third embodiment of the invention.
Figure 6:
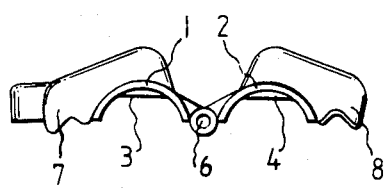
FIG. 6 is a top plan view of FIG. 5.
Figure 7:
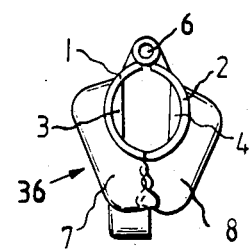
FIG. 7 is a top plan view of FIG. 5 but with two gripping cheeks in the closed position.

Reference is now made to FIGS. 5 through 7 which depict another embodiment of the invention.

Pivotable longitudinal gripping cheeks 1 and 2 are pivotally supported on an axle 5 extending through the axis of the symmetry of the cutting tool in the same manner as has been described for FIGS. 1–4. Cutting edges or elements 3 and 4 are provided at both cheeks near the ends thereof, which cutting edges extend normal to the elongation of the gripping cheeks and formed on the inner faces of respective cheeks 1 and 2. In this embodiment a wire stripper generally indicated as 36 is provided which is arranged on the outer or external surfaces of cheeks 1 and 2. The wire stripper 36 is comprised of two knife blades 7 and 8 which are rigidly connected by any suitable conventional means to respective blades 7 and 8. When gripping cheeks 1 and 2 are pivoted towards each other and folded to form an opening therebetween to receive a cable to be stripped blades 7 and 8 also move towards each other and engage one over another like scissors. Due to this action of blades 7 and 8 the isolation sheath of the cable cut by cutting edges 3 and 4 is separated and cut off from the wire.

In another modification of the cutting and stripping tool of the present invention a further wire stripping arrangement is provided. In this arrangement instead of blades 7 and 8, oppositely disposed and mirrow-inverted sharp-edged dents or notches 11 and 13, and 12 and 14 are formed on two opposite longitudinal edges of cheeks 1 and 2. Dents 13 through 14 are positioned below cutting edges 3 and 4. Two opposite dents 11, 13 are spaced from two opposite dents 12 and 14.

When cheeks 1 and 2 are moved to the closed position dents 11, 12, 13 and 14 cut and separate with their sharp edges the insulation sheath from the wire.

The above-described embodiment of the cutting tool provides a universal tool with which any kind of insulation sheath as well as the cable insulation sheath can be removed from the respective core.

In the embodiment shown in FIGS. 8 to 11 cheeks 1 and 2 are of greater width than that of the cheeks of the above-described embodiments. However, the arrangement of cheeks 1 and 2 on the central axle for pivoting by means of hinge joints 5 and 6 is similar to the embodiments of FIGS. 1-7.

Figure 8:
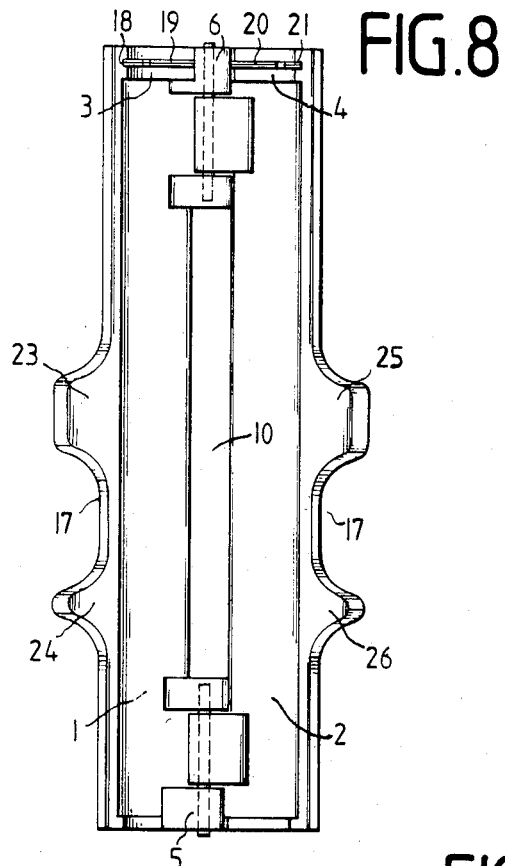
FIG. 8 is a side view of the stripping tool with two gripping cheeks in the open position, according to another embodiment of the invention.
Figure 9:
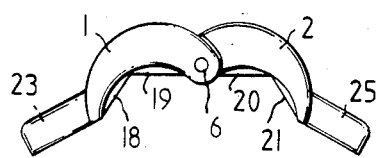
FIG. 9 is a top plan view of FIG. 8.
Figure 10:
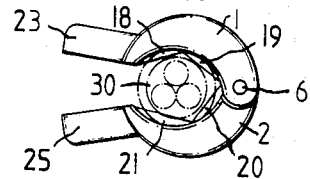
FIG. 10 is a top plan view of FIG. 8 but with the gripping cheeks illustrated in the almost closed position.

In the embodiment depicted in FIG. 8 each cutting edge or element 3 or 4 provided on gripping cheek 1 or 2, respectively, is formed by two pieces 18 and 19 on cheek 1 and two pieces 20 and 21 on cheek 2. As clearly shown in FIG. 9 respective pieces 18 and 19 as well as 20 and 21 are angularly positioned with respect to each other, so that the cutting edge formed by the two respective pieces extends along the inner periphery of the respective gripping cheek.

When cheeks 1 and 2 are closed and cable 30 is inserted into the space formed by the closed cheeks a somewhat circular cutting edge is formed on the inner faces of two cheeks 1 and 2 whereby upon rotation of the tool or two cheeks about the cable the circular cutting edge formed by pieces 18, 19, 20 and 21 will produce a circular cut on the insulation sheath surrounding the wire so that complete separation of the insulation sheath from the wire just by one rotation of the tool practically through 90° will be accomplished.

Figure 11:
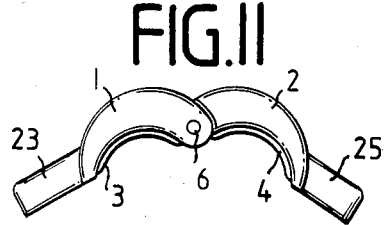
FIG. 11 is a top plan view similar to FIG. 9 but according to a further embodiment of the invention.

In a further modification of the cutting tool shown in Fig.11 cutting edges 3 and 4 are formed as arc-shaped pieces which conform to the inner faces of respective cheeks 1 and 2. In this embodiment a circular cutting edge is also formed and the necessary circular cut on the insulation sheath will be obtained also upon rotation of the tool through approximately 90° similarly to the operation of the embodiment of FIG. 9.

As shown in FIG. 8 symmetric double projections 23, 24 and 25, 26 are provided on cheeks 1 and 2 for hand manipulation of the cutting tool, these projections form a compact hump when the cheeks are in the closed position. An operator's finger, for example a point finger can be inserted into a space 17 between projections 23, 24 and 25, 26; this can substantially facilitate holding of the tool during the stripping of the separated insulation sheath from the cable.

It will be understood that each of the elements described above, or two or more together, may also find a useful application in other types of tools for cutting and stripping cables differing from the types described above.

While the invention has been illustrated and described as embodied in a tool for cutting and stripping cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutting tool for stripping an insulation sheath from single-wire or multi-wire cables, having an axis of symmetry and comprising two elongated and semi-cylindrical gripping cheeks connected to each other, each of said cheeks having an inner face and carrying at least one cutter element having a width substantially corresponding to a thickness of the sheath to be stripped from a cable, the respective cutter element being arranged on the inner face of the assigned gripping cheek and extended therefrom in the direction substantially perpendicular to the elongation of the respective cheek, said cheeks being pivotally mounted to each other to pivot about said axis of symmetry between an open position to receive a cable to be processed and a closed position in which the inner faces of the gripping cheeks are located opposite to each other and said cutter elements are in the position to make a cut on said insulation sheath; and wire-stripping means including two blades each rigidly connected to the respective gripping cheek, said gripping cheeks each having an outer face opposite to the inner face carrying the cutter element, said blades being mounted to the outer faces of the respective cheeks, said blades having end portions which engage one over another in a scissor-like manner when said cheeks are in the closed position to strip the insulation sheath from a wire of the cable.

2. The tool as defined in claim 1, wherein said gripping cheeks are connected to each other by at least one hinge joint.

3. The tool as defined in claim 1, wherein said gripping cheeks are connected to each other by a number of hinge joints having a common hinge axis.

4. The tool as defined in claim 3, wherein said hinge joints extend through said axis of symmetry.

5. The tool as defined in claim 4, wherein at least one of the gripping cheeks is formed with a projection for a hand manipulating by the tool.

6. The tool as defined in claim 5, wherein said projection is located approximately midway between two ends of the cheek on which said projection is formed.

7. The tool as defined in claim 5, wherein said cutter elements are of a shape which conforms to the shape of the inner face of the respective gripping cheek.

8. The tool as defined in claim 7, wherein said cutter element is each formed of two pieces.

9. The tool as defined in claim 8, wherein said two pieces are arranged at an angle to each other.

10. The tool as defined in claim 7, wherein the shape of the cutter element is constituted by a portion of a circle.

11. The tool as defined in claim 5, wherein at least two projections are formed on each cheek for a hand manipulating by the tool, said projections being spaced from each other in the direction of elongation of the respective cheek to form humps with a space therebetween, the respective projections formed on two opposite cheeks being symmetrical relative to said axis.

12. A cutting tool for stripping an insulation sheath from single-wire or multi-wire cables, having an axis of symmetry and comprising two elongated and semi cylindrical gripping cheeks connected to each other, each of said cheeks having an inner face and carrying at least one cutter element having a width substantially corresponding to a thickness of the sheath to be stripped from a cable, the respective cutter element being arranged on the inner face of the assigned gripping cheek and extended therefrom in the direction substantially perpendicular to the elongation of the respective cheek, said cheeks being pivotally mounted to each other to pivot about said axis of symmetry between an open position to receive a cable to be processed and a closed position in which the inner faces of the gripping cheeks are located opposite to each other and said cutter elements are in the position to make a cut on said insulation sheath; and wire-stripping means including a plurality of dents with sharp edges, said cheeks each including an elongated edge on the inner face thereof, said dents being disposed in mirror-inverted pairs and formed respectively on the elongated edges of the gripping cheeks.

13. The tool as defined in claim 12, wherein said gripping cheeks are connected to each other by at least one hinge joint.

14. The tool as defined in claim 13, wherein said gripping cheeks are connected to each other by a number of hinge joints having a common hinge axis.

15. The tool as defined in claim 14, wherein said hinge joints extend through said axis of symmetry.

16. The tool as defined in claim 15, wherein at least one of the gripping cheeks is formed with a projection for a hand manipulating by the tool.

17. The tool as defined in claim 16, wherein said projection is located approximately midway between two ends of the cheek on which said projection if formed.

18. The tool as defined in claim 16, wherein said cutter elements are of a shape which conforms to the shape of the inner face of the respective gripping cheek.

19. The tool as defined in claim 18, wherein said cutter element is each formed of two pieces.

20. The tool as defined in claim 19, wherein said two pieces are arranged at an angle to each other.

21. The tool as defined in claim 18, wherein the shape of the cutter element is constituted by a portion of a circle.

22. The tool as defined in claim 16, wherein at least two projections are formed on each cheek for a hand manipulating by the tool, said projections being spaced from each other in the direction of elongation of the respective cheek to form humps with a space therebetween, the respective projections formed on two opposite cheeks being symmetrical relative to said axis.

* * * * *